United States Patent
Taguchi et al.

(10) Patent No.: US 6,639,754 B2
(45) Date of Patent: Oct. 28, 2003

(54) PERPENDICULAR MAGNETIC RECORDING HEAD AND PERPENDICULAR MAGNETIC RECORDING APPARATUS

(75) Inventors: Tomoko Taguchi, Kunitachi (JP); Tetsuya Roppongi, Kawasaki (JP); Shinichi Horinouchi, Ichikawa (JP); Haruyuki Morita, Komoro (JP); Mikio Matsuzaki, Saitama (JP)

(73) Assignees: Kabushiki Kaisha Toshiba, Tokyo (JP); TDK Corporation, Tokyo (JP)

( * ) Notice: Subject to any disclaimer, the term of this patent is extended or adjusted under 35 U.S.C. 154(b) by 201 days.

(21) Appl. No.: 09/951,380

(22) Filed: Sep. 14, 2001

(65) Prior Publication Data

US 2002/0039254 A1 Apr. 4, 2002

(30) Foreign Application Priority Data

Sep. 25, 2000 (JP) ......................................... 2000-291295

(51) Int. Cl.$^7$ .............................................. G11B 5/127
(52) U.S. Cl. ...................................... 360/125; 360/317
(58) Field of Search ............................... 360/125–126, 360/317–318

(56) References Cited

U.S. PATENT DOCUMENTS 4,631,612 A   12/1986   Shiiki et al.
5,680,283 A   10/1997   Tanaka et al.
6,407,892 B2 * 6/2002   Shiroishi ..................... 360/126

FOREIGN PATENT DOCUMENTS

| JP | 2-29904 | 1/1990 |
| JP | 6-223310 | 8/1994 |
| JP | 08315311 | 11/1996 |
| JP | 10320720 | 12/1998 |
| JP | 10-320720 | 12/1998 |
| WO | WO 90/07178 | 6/1990 |

* cited by examiner

Primary Examiner—A. J. Heinz
(74) Attorney, Agent, or Firm—Finnegan, Henderson, Farabow, Garrett & Dunner, L.L.P.

(57) ABSTRACT

A perpendicular magnetic recording apparatus includes a magnetic disk having a perpendicular double-layer film and a perpendicular magnetic recording head having a leading pole positioned forward along the head traveling direction, a trailing pole positioned backward along the head traveling direction at a gap length from the leading pole and having, in an air-bearing surface, a forward pole and a rearward pole of which saturation magnetic flux density is higher than that of the forward pole, and an exciting coil. A length p of the trailing pole along the head traveling direction is longer than a length T of the trailing pole in a track width direction, the length p is longer than the gap length g1, and a length p1 of the rearward pole is shorter than a length p2 of the forward pole along the head traveling direction.

10 Claims, 5 Drawing Sheets

PERPENDICULAR MAGNETIC RECORDING HEAD AND PERPENDICULAR MAGNETIC RECORDING APPARATUS

CROSS-REFERENCE TO RELATED APPLICATIONS

This application is based upon and claims the benefit of priority from the prior Japanese Patent Application No. 2000-291295, filed Sep. 25, 2000, the entire contents of which are incorporated herein by reference.

BACKGROUND OF THE INVENTION

1. Field of the Invention

The present invention relates to a perpendicular magnetic recording head and a perpendicular magnetic recording apparatus.

2. Description of the Related Art

In a computer field, a magnetic disk apparatus has been much utilized as a randomly accessible external storage having a large capacity. Moreover, with expanding utilization, for the magnetic disk apparatus, there has been an increasing demand for a large storage capacity and a high recording density.

As a method of enhancing the recording density of the magnetic disk apparatus, perpendicular magnetic recording has been proposed. In the perpendicular magnetic recording, as compared with longitudinal magnetic recording, a demagnetizing field in a magnetization transition can remarkably be reduced, a magnetization transition width can be narrowed, and high-density recording is realized. Moreover, in order to raise recording and reproducing efficiencies in the perpendicular magnetic recording, and form a steeper magnetization transition, a magnetic disk of a perpendicular double-layer medium having a soft magnetic backing layer disposed under a perpendicular magnetic recording layer has been proposed.

As a conventional perpendicular magnetic recording head for the perpendicular double-layer medium formed by stacking the soft magnetic backing layer and perpendicular magnetic recording layer, a head having the following structure has heretofore been used. The structure includes a trailing pole (main pole) and a leading pole (auxiliary pole) having a large area in an air-bearing surface, which are disposed with a gap, and an exciting coil acting on these poles. In the perpendicular magnetic recording head, a magnetic field generated by the exciting coil is passed through the trailing pole, soft magnetic backing layer and leading pole to form a closed magnetic path, a magnetic flux can be concentrated on the trailing pole, and a recording efficiency can therefore be enhanced.

In Jpn. Pat. Appln. KOKAI Publication No. 10-320720, it is described that the trailing pole is formed by a forward pole and a rearward pole having a magnetic flux density higher than that of the forward pole, a strong magnetic field is generated from the rearward pole and therefore the recording density is enhanced.

However, when a track width is further narrowed and track density is increased in order to enhance the recording density, a sufficient magnetic field cannot be generated from the whole trailing pole, and it is disadvantageously difficult to overwrite recorded magnetization with a satisfactory SN ratio.

BRIEF SUMMARY OF THE INVENTION

An object of the present invention is to provide a perpendicular magnetic recording head capable of overwriting recorded magnetization at a satisfactory SN ratio even when a track width is narrowed and a track density is increased, and to provide a perpendicular magnetic recording apparatus comprising such a perpendicular magnetic recording head.

According to one aspect of the present invention, there is provided a perpendicular magnetic recording head comprising: a leading pole positioned forward along a head traveling direction; a trailing pole positioned backward along the head traveling direction at a gap length g1 from the leading pole, the trailing pole having a length p along the head traveling direction and a length T in a track width direction, and the trailing pole comprising, in an air-bearing surface, a forward pole having a length p2 along the head traveling direction and a rearward pole having a length p1 along the head traveling direction of which saturation magnetic flux density is higher than that of the forward pole; and an exciting coil, wherein the length p of the trailing pole along the head traveling direction is longer than the length T of the trailing pole in the track width direction, the length p is longer than the gap length g1 between the leading pole and the trailing pole, and the length p1 of the rearward pole along the head traveling direction is shorter than the length p2 of the forward pole along the head traveling direction.

According to another aspect of the present invention, there is provided a perpendicular magnetic recording apparatus comprising; a magnetic disk comprising a perpendicular double-layer film of a soft magnetic backing layer and a perpendicular magnetic recording layer; and a perpendicular magnetic recording head comprising a leading pole positioned forward along a head traveling direction, a trailing pole positioned backward along the head traveling direction at a gap length g1 from the leading pole, the trailing pole having a length p along the head traveling direction and a length T in a track width direction, and the trailing pole comprising, in an air-bearing surface, a forward pole having a length p2 along the head traveling direction and a rearward pole having a length p1 along the head traveling direction of which saturation magnetic flux density is higher than that of the forward pole, and an exciting coil, wherein the length p of the trailing pole along the head traveling direction is longer than the length T of the trailing pole in the track width direction, the length p is longer than the gap length g1 between the leading pole and the trailing pole, and the length p1 of the rearward pole along the head traveling direction is shorter than the length p2 of the forward pole along the head traveling direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the drawings.

Figure 1:
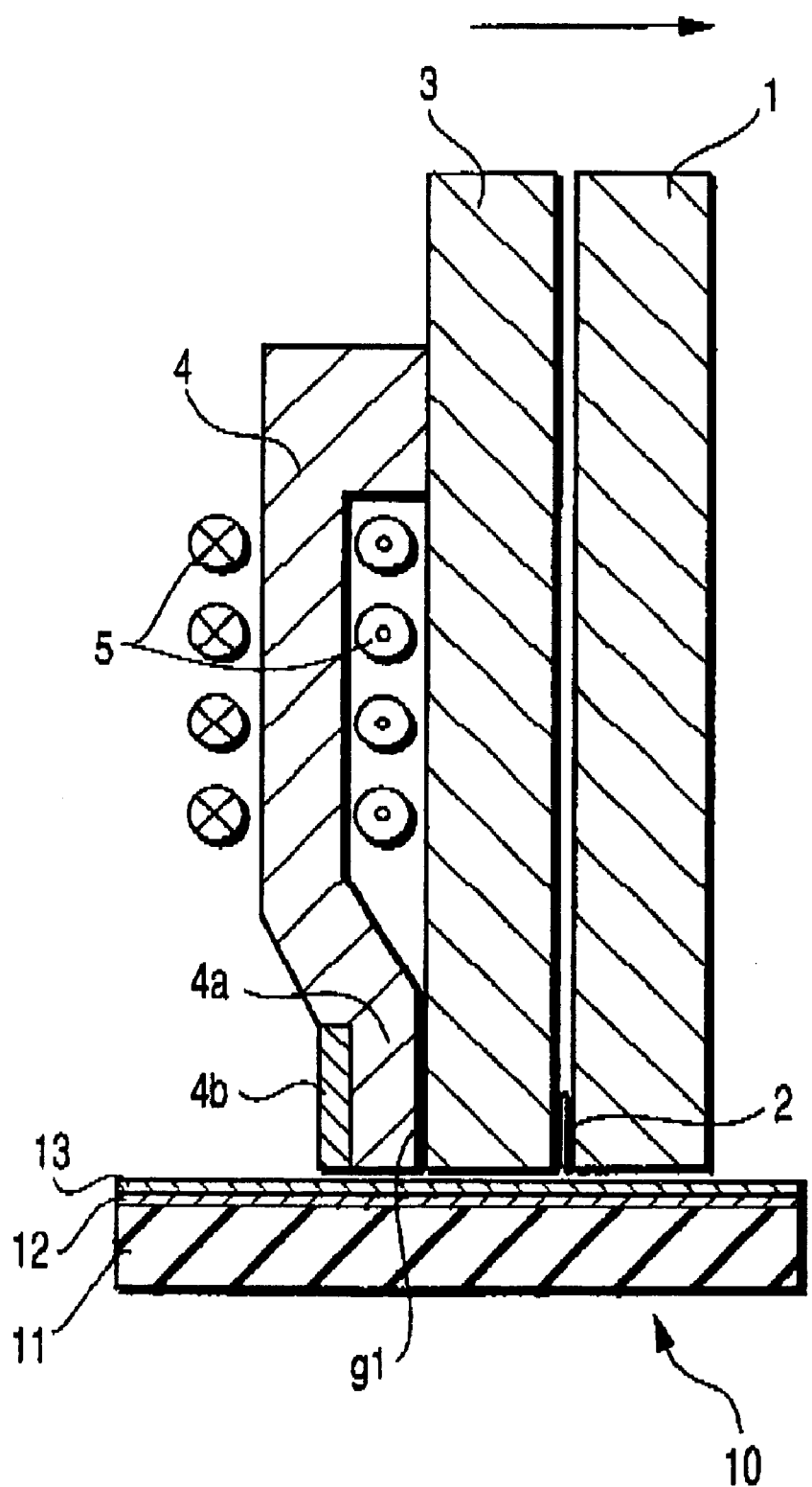
FIG. 1 is a sectional view of a perpendicular magnetic recording apparatus cut along a head traveling direction according to one embodiment of the present invention.
Figure 2:
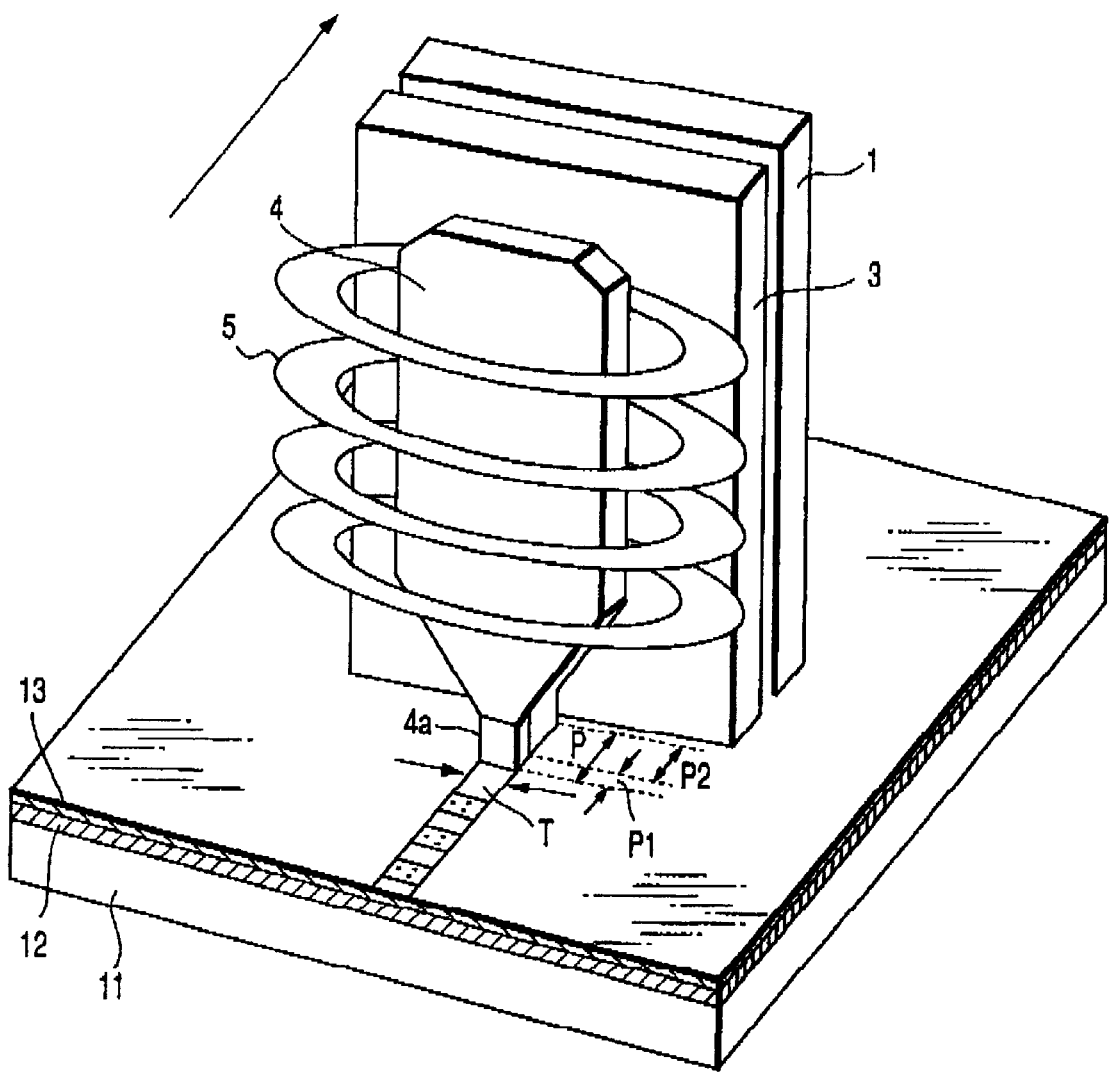
FIG. 2 is a perspective view of the perpendicular magnetic recording apparatus according to one embodiment of the present invention.
Figure 3:
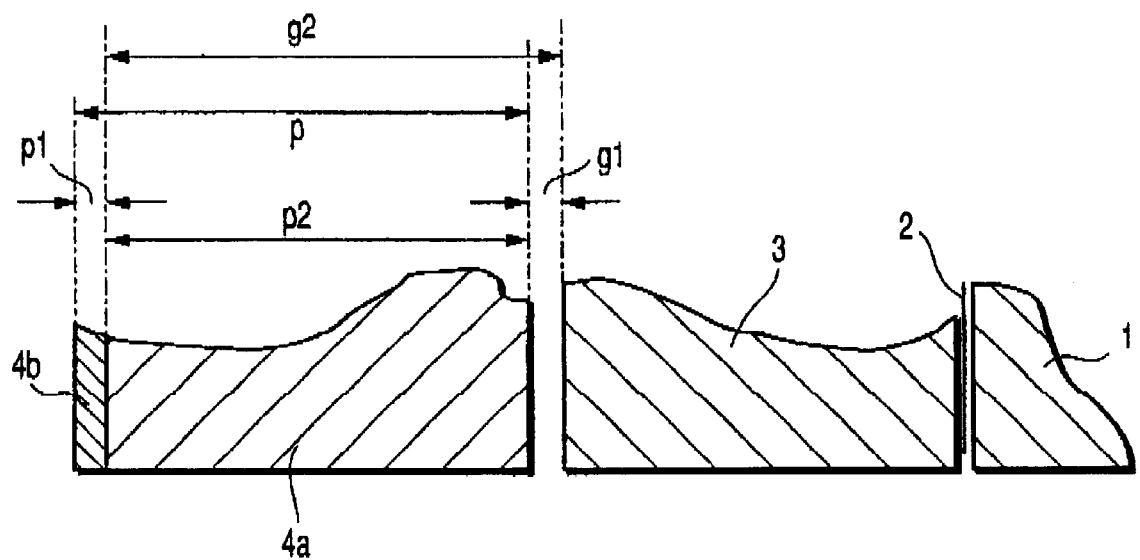
FIG. 3 is an enlarged sectional view of an air-bearing portion of the magnetic head shown in FIG. 1.

FIG. 1 is a sectional view of a perpendicular magnetic recording apparatus cut along a head traveling direction (direction opposite to a medium moving direction) according to one embodiment of the present invention, FIG. 2 is a perspective view of the perpendicular magnetic recording apparatus according to the embodiment of the present invention, and FIG. 3 is an enlarged sectional view of an air-bearing portion of the magnetic head shown in FIG. 1.

A perpendicular magnetic recording medium (magnetic disk) 10 is a double-layer medium having a structure that stacked on the substrate 11 are the soft magnetic backing layer 12 and the perpendicular magnetic recording layer 13 having magnetic anisotropy in a direction perpendicular to the film surface. Additionally, a protective layer and lubricant layer (not shown) may be formed on the perpendicular magnetic recording layer 13. Moreover, an underlayer may be disposed under the soft magnetic backing layer 12 or the perpendicular magnetic recording layer 13 for a purpose of controlling crystal orientation.

A structure of the magnetic head according to an embodiment of the present invention will be described. The magnetic head has a merged structure of a reproducing section and a recording section in which the leading pole 3 of the recording section also functions as one of a pair of shields sandwiching a reproduce element in the reproducing section. More specifically, the lower shield 1, the reproduce element (e.g., GMR element) 2 buried in an insulating layer for defining the reproduction gap, and the upper shield (common pole) also functioning as the leading pole 3 of the recording section form the reproducing section. Moreover, the recording section is formed by the leading pole 3, a trailing pole 4 formed at a gap from the leading pole 3 in an air-bearing surface and magnetically coupled to the leading pole 3 in a position remote from the air-bearing surface, and an exciting coil 5 acting on these leading pole 3 and trailing pole 4.

In the embodiment, the air-bearing surface of the trailing pole 4 is formed of the forward pole 4a positioned forward and the rearward pole 4b positioned backward along the head traveling direction. Moreover, the rearward pole 4b is formed of a material having a saturation magnetic flux density higher than that of the forward pole 4a, so that a magnetic flux is concentrated under the rearward pole 4b.

The trailing pole 4 and the forward pole 4a and rearward pole 4b forming the air-bearing surface of the trailing pole 4 will be described in more detail.

In the present embodiment, the entire length p of the trailing pole 4 along the head traveling direction is longer than the length T in the track width direction. As a result, the area of the air-bearing surface of the entire trailing pole 4 is sufficiently enlarged and a sufficient magnetic field can be generated. Therefore, even if a track width is narrowed and track density is raised, overwriting is effectively performed at a satisfactory SN ratio.

In the present embodiment, the entire length p of the trailing pole 4 along the head traveling direction is longer than the gap length g1 between the leading pole 3 and the trailing pole 4. Moreover, the length p1 of the rearward pole 4b having a high saturation magnetic flux density along the head traveling direction is shorter than the length p2 of the forward pole 4a along the head traveling direction in the air-bearing surface of the trailing pole 4. In this manner, the length of the rearward pole 4b formed of a material having a high saturation magnetic flux density is shortened. Thereby, a magnetic field strength in the rear end of the trailing pole 4 that largely contributes to formation of magnetization transition in the medium is raised. When the gap length g1 is reduced, inclination of the magnetic field can be steep, and the magnetization transition with a satisfactory SN ratio is advantageously formed.

Moreover, in the present embodiment, the length p1 of the rearward pole 4b along the head traveling direction is preferably shorter than the length T in the track width direction. In this case, the magnetic flux can further be concentrated under the rearward pole 4b. Furthermore, even when a magnetic pole is skewed with respect to a medium recording track, influence onto an adjacent track can be minimized, and recorded magnetization in the adjacent track can be prevented from being erased.

Figure 4:
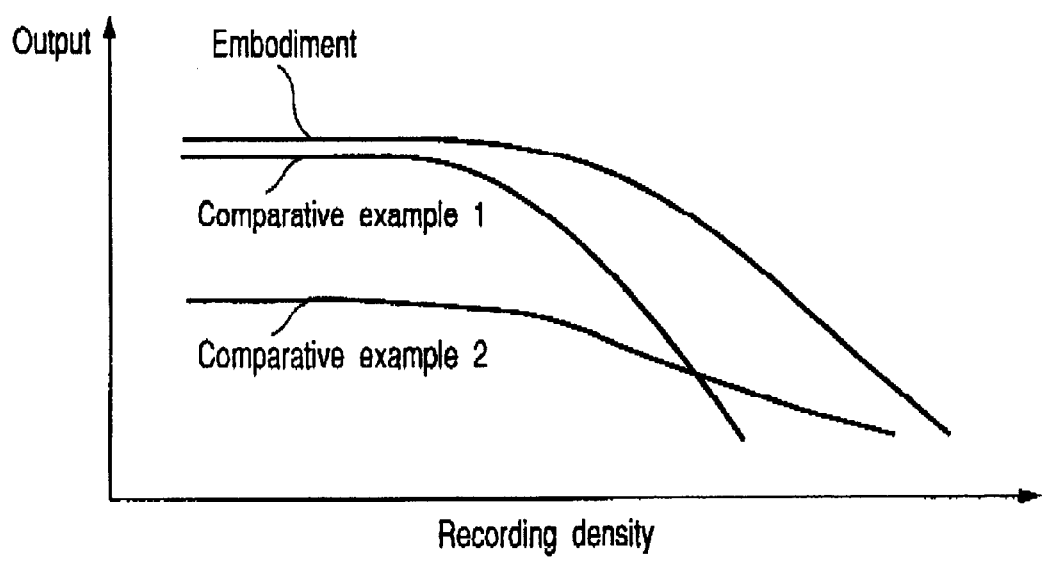
FIG. 4 is a diagram showing a relationship between recording density and output when a magnetic head according to one embodiment of the present invention and magnetic heads of comparative examples 1, 2 are used.

FIG. 4 shows a relationship between recording density and output when a magnetic head according to one embodiment of the present embodiment and magnetic heads of comparative examples 1, 2 are used. The magnetic head of the comparative example 1 is a so-called ring head that is generally for use in a longitudinal recording system and whose magnetic core is formed of one material. The magnetic head of the comparative example 2 is a single pole head that has heretofore been used in a conventional perpendicular recording system.

When the ring head of the comparative example 1 is used, an output rapidly drops as the recording density increases. When the single pole head of the comparative example 2 is used, recording is possible at a high density but an output is remarkably small as compared with the ring head. On the other hand, for the use of the magnetic head of the embodiment, even when the track width is narrowed, a sufficient recording magnetic field can be secured. Therefore, the high-density recording can be realized, and additionally a high output can be obtained.

Figure 5:
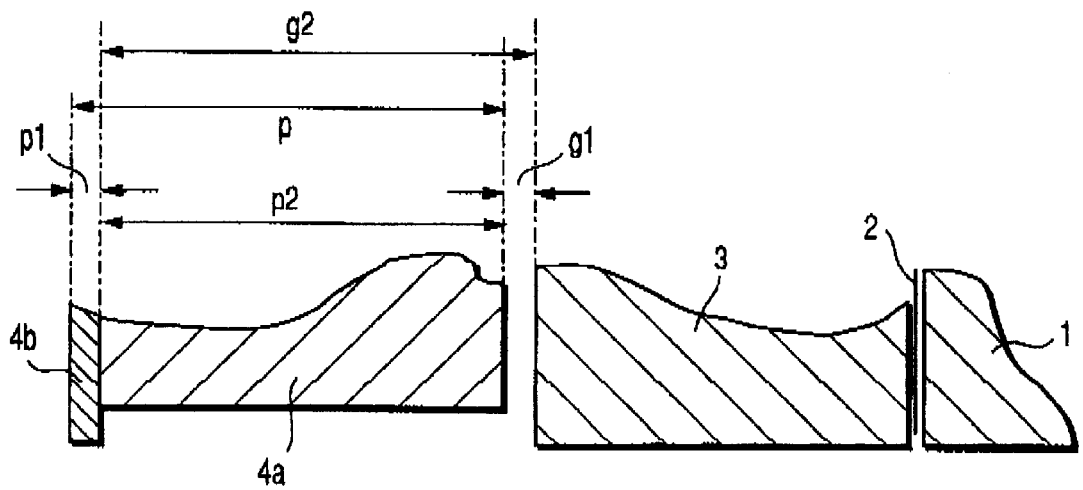
FIG. 5 is an enlarged sectional view of an air-bearing portion of a magnetic head according to another embodiment of the present invention.

As shown in FIG. 5, in another embodiment according to the present invention, the air-bearing surface of the forward pole 4a may be recessed from the air-bearing surface of the rearward pole 4b. In this case, the magnetic flux can further be concentrated under the rearward pole 4b, and a satisfactory overwrite characteristic is advantageously obtained.

Figure 6:
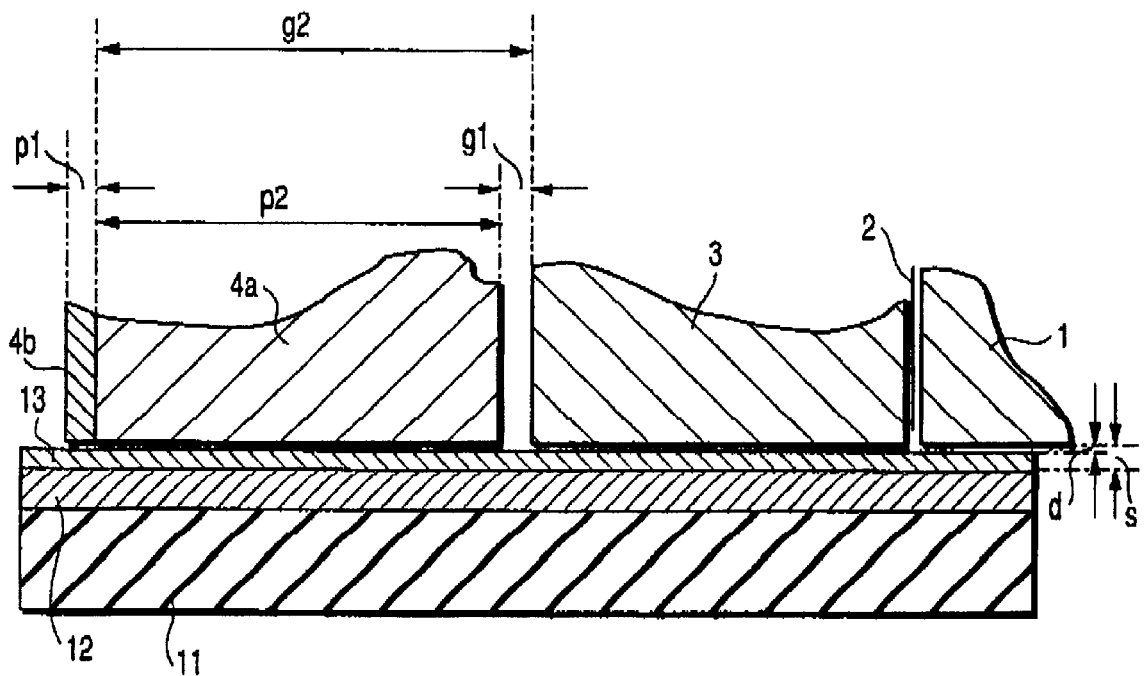
FIG. 6 is an enlarged sectional view of a magnetic head and a perpendicular magnetic recording medium according to another embodiment of the present invention.

A suitable relationship of the dimensions of the magnetic pole forming the magnetic head in the perpendicular magnetic recording apparatus according to one embodiment of the present invention with the distance between the magnetic head and the medium will be described with reference to FIG. 6. In the perpendicular magnetic recording apparatus of the present embodiment, it is preferable to apply beforehand an in-plane magnetic field to recorded magnetization in the perpendicular magnetic recording layer from the recording gap of the magnetic head so as to form an appropriate flow of magnetic flux so that satisfactory overwrite characteristics are provided without leaving any previous magnetization.

In order to efficiently apply the in-plane magnetic field to the perpendicular magnetic recording layer under the recording gap of the magnetic head, the gap length g1 between the leading pole 3 and the trailing pole 4 is preferably set to be longer than the distance d between the air-bearing surface of the trailing pole 4 and the surface of the perpendicular magnetic recording layer 13 of the medium. If the gap length g1 is shorter than the distance d, the magnetic flux amount passed through the forward pole 4a and leading pole 3 becomes larger than the magnetic flux amount flowing through the recording layer 13. Therefore, a sufficient in-plane magnetic field is not applied to the recording layer 13, and the previous magnetization cannot sufficiently be erased.

On the other hand, the surface of the soft magnetic backing layer 12 of the medium forms a mirror image surface of the magnetic head. Therefore, the gap length g1 between the leading pole 3 and the trailing pole 4 is preferably set to be shorter than twice the distance s between the air-bearing surface of the trailing pole 4 and the surface of the soft magnetic backing layer 12 of the medium. If the gap length g1 is longer than the distance 2s, the perpendicular component of the magnetic field applied to the recording layer 13 right under the gap becomes stronger than the in-plane component.

As described above, in order to sufficiently apply the in-plane magnetic field to the recording layer 13 right under the gap, the magnetic disk apparatus is preferably designed to satisfy the relationship of $d<g1<2s$.

Moreover, in order to apply a sufficient perpendicular magnetic field component to the recording layer 13 from the rearward pole 4b of the trailing pole 4, the distance g2 between the rear end of the leading pole 3 and the front end of the rearward pole 4b of the trailing pole 4 is preferably longer than twice the distance s between the air-bearing surface of the trailing pole 4 and the surface of the soft magnetic backing layer 12 of the medium. On the other hand, if the distance g2 is too long, the total amount of the magnetic flux passed through the soft magnetic backing layer 12 from the trailing pole 4 and returned to the leading pole 3 is reduced, which results in reducing the magnetic field strength, so that the overwrite SN ratio drops.

Figure 7:
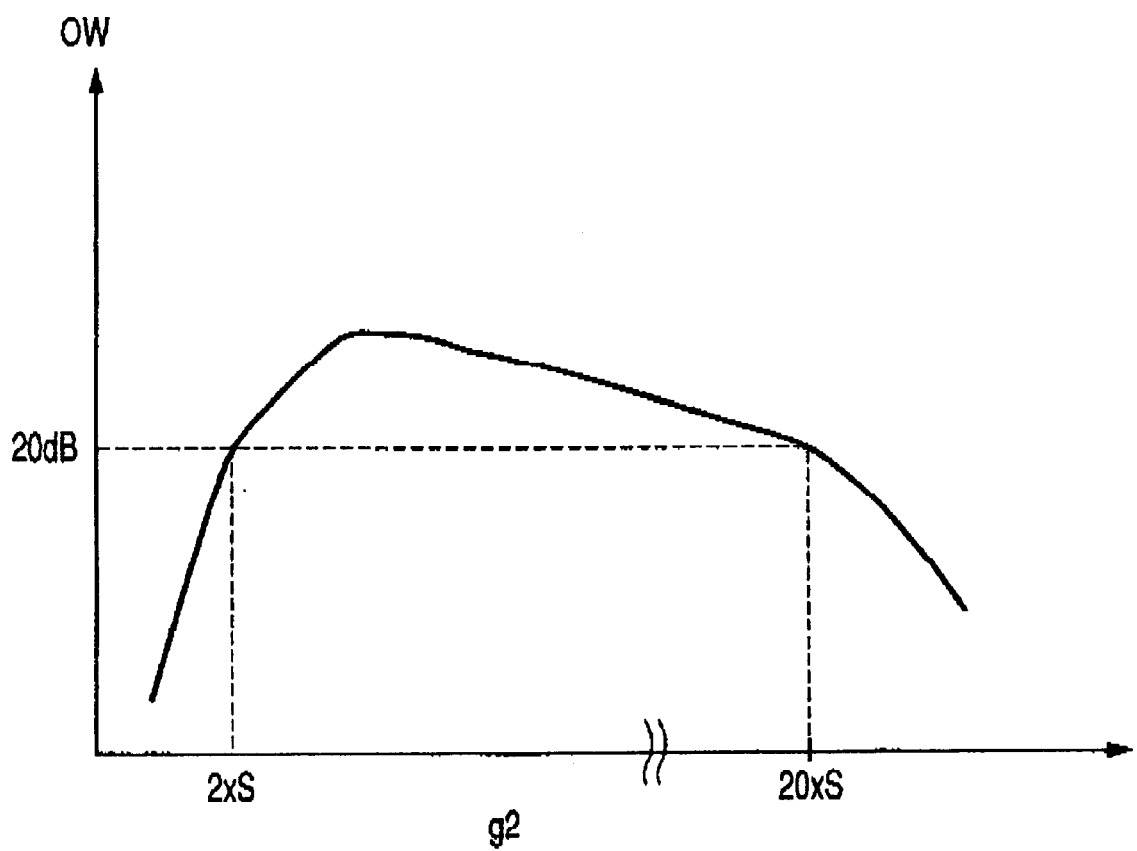
FIG. 7 is a diagram showing a relationship of distance g2 between a leading pole and a rearward pole of a trailing pole with overwrite SN ratio in a perpendicular magnetic recording apparatus according to one embodiment of the present invention.

FIG. 7 shows a relationship between the distance g2 represented by a multiple of the distance s and the overwrite SN ratio. It is seen from FIG. 7 that, in order to secure an overwrite SN ratio of 20 dB or more, the relationship of $2s<g2<20s$ preferably be satisfied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular magnetic recording head comprising:
   a leading pole positioned forward along a head traveling direction;
   a trailing pole positioned backward along the head traveling direction at a gap length g1 from the leading pole, the trailing pole having a length p along the head traveling direction and a length T in a track width direction, and the trailing pole comprising, in an air-bearing surface, a forward pole having a length p2 along the head traveling direction and a rearward pole having a length p1 along the head traveling direction of which saturation magnetic flux density is higher than that of the forward pole; and
   an exciting coil,
   wherein the length p of the trailing pole along the head traveling direction is longer than the length T of the trailing pole in the track width direction, the length p is longer than the gap length g1 between the leading pole and the trailing pole, and the length p1 of the rearward pole along the head traveling direction is shorter than the length p2 of the forward pole along the head traveling direction.

2. The head according to claim 1, wherein the length p1 of the rearward pole along the head traveling direction is shorter than the length T of the rearward pole in the track width direction.

3. The head according to claim 1, wherein an air-bearing surface of the forward pole is recessed from the air-bearing surface of the rearward pole.

4. The head according to claim 1, wherein the leading pole is used as one of a pair of shields sandwiching a reproduce element.

5. A perpendicular magnetic recording apparatus comprising:
   a magnetic disk comprising a perpendicular double-layer film of a soft magnetic backing layer and a perpendicular magnetic recording layer; and
   a perpendicular magnetic recording head comprising a leading pole positioned forward along a head traveling direction, a trailing pole positioned backward along the head traveling direction at a gap length g1 from the leading pole, the trailing pole having a length p along the head traveling direction and a length T in a track width direction, and the trailing pole comprising, in an air-bearing surface, a forward pole having a length p2 along the head traveling direction and a rearward pole having a length p1 along the head traveling direction of which saturation magnetic flux density is higher than that of the forward pole, and an exciting coil,
   wherein the length p of the trailing pole along the head traveling direction is longer than the length T of the trailing pole in the track width direction, the length p is longer than the gap length g1 between the leading pole and the trailing pole, and the length p1 of the rearward pole along the head traveling direction is shorter than the length p2 of the forward pole along the head traveling direction.

6. The apparatus according to claim 5, wherein the length p1 of the rearward pole along the head traveling direction is shorter than the length T of the rearward pole in the track width direction.

7. The apparatus according to claim 5, wherein an air-bearing surface of the forward pole is recessed from the air-bearing surface of the rearward pole.

8. The apparatus according to claim 5, wherein the gap length g1 between the leading pole and the trailing pole, a distance d between an air-bearing surface of the trailing pole and an upper surface of the magnetic disk, and a distance s between the air-bearing surface of the trailing pole and the upper surface of the soft magnetic backing layer of the magnetic disk satisfy a relationship of $d<g1<2s$.

9. The apparatus according to claim 5, wherein a gap length g2 between the leading pole and the rearward pole of the trailing pole, and a distance s between an air-bearing surface of the trailing pole and an upper surface of the soft magnetic backing layer of the magnetic disk satisfy a relationship of $2s<g2<20s$.

10. The apparatus according to claim 5, wherein the leading pole is used as one of a pair of shields sandwiching a reproduce elements.

* * * * *